United States Patent [19]

Seo

[11] Patent Number: 5,567,180

[45] Date of Patent: Oct. 22, 1996

[54] CABLE MANAGER SYSTEM OF A COMPUTER

[75] Inventor: Yeol G. Seo, Suwon, Rep. of Korea

[73] Assignee: Samsung Electronics Co., Ltd., Kyungki-Do, Rep. of Korea

[21] Appl. No.: 271,728

[22] Filed: Jul. 7, 1994

[30] Foreign Application Priority Data

Jul. 7, 1993 [KR] Rep. of Korea ..................... 93-12735
May 25, 1994 [KR] Rep. of Korea ..................... 94-11425

[51] Int. Cl.6 .................................................. H01R 25/00
[52] U.S. Cl. ............................................ 439/638; 439/654
[58] Field of Search ................................. 439/607–610, 439/638–655, 928, 928.1, 540

[56] References Cited

U.S. PATENT DOCUMENTS 5,207,586  5/1993  MacGregor et al. .................. 439/76
5,217,394  6/1993  Ho ......................................... 439/638
5,372,522  12/1994  Hoeft ................................... 439/654

Primary Examiner—David L. Pirlot
Attorney, Agent, or Firm—Sughrue, Mion, Zinn, Macpeak & Seas

[57] ABSTRACT

A cable manager system unifying ports of peripheral equipment between the computer-side ports and the peripheral equipment-side ports to enhance the convenience of a user at the time of connecting the peripheral equipment to the computer. A connecting body includes a plurality of ports for being connected with computer-side ports on one side end of a computer body, a plurality of ports for being connected with peripheral equipment-side ports on the other side end, and a printed circuit board for electrically connecting the ports to each other, and thus connecting the peripheral equipment-side ports with the computer-side ports integrally and electrically. An outer case protects the connecting body from dust and impact.

17 Claims, 8 Drawing Sheets

CABLE MANAGER SYSTEM OF A COMPUTER

BACKGROUND OF THE INVENTION

1. Field of the Invention

The present invention relates to a cable manager system of a computer. More particularly, it relates to a cable manager system that can eliminate the inconvenience of removing a connector from every peripheral device at the time of installing or removing the peripheral devices by uniting every connector of several peripheral devices connected to a computer that is frequently moved from location to location.

2. Description of the Prior Art

Referring first to a conventional technique, FIG. 1 is a perspective view showing a cable for peripheral equipment mounted on a computer according to the conventional device.

The combination includes a body C of a computer; computer-side ports 3 attached to the rear portion of the body C; peripheral equipment-side ports (or connectors) 1 connected to corresponding peripheral equipment via a cable; mounting screws 2 inserted into screw holes of the peripheral equipment-side ports 1 so that the peripheral equipment-side ports 1 are connected to the computer-side ports 3.

The conventional technique of connection is now described.

The peripheral equipment-side ports 1 approach the computer-side ports 3 attached to the rear portion of the computer's body C in order to be connected with the computer-side ports 1.

When the peripheral equipment-side ports 1 are connected to the computer-side ports 3, two mounting screws 2 are inserted to the screw holes formed on both ends of the peripheral equipment-side ports 1 to fix the connection of the two ports.

After screwing the mounting screws 2 completely, the peripheral equipment-side ports 1 are installed to the computer-side ports 3. The peripheral equipment side ports 1 are removed from the computer-side ports 3 by unscrewing the mounting screws 2.

The general computer peripheral equipment includes a printer, a monitor, a key board, etc. and an auxiliary power system for a portable computer includes an adapter, a direct current/alternating current converter.

As the efficiency of portable computers increases and the computer has a function such as multi-media, there is a trend that more extra peripheral equipment such as an external modulator/demodulator (MODEM), is connected to the computer in order to raise the applicability of the computer.

That is, the number of the computer-side ports 3 that is to be connected with peripheral equipment is high. Accordingly, in a case that a cable for peripheral equipment is connected to a computer that is frequently moved such as a portable computer, a user must assemble every port of the peripheral equipment with the ports of a computer by mounting screws.

SUMMARY OF THE INVENTION

The present invention is made in an effort to solve the above problems.

It is an object of the present invention to provide of a cable manager system uniting ports of various equipment so that when the computer is moved the ports of the peripheral equipment can be installed just by removing the cable manager system from the computer-side port.

In order to achieve the above object, a cable manager system of a computer of this invention, comprises:

a connecting body including a plurality of ports for being connected with computer-side ports on one side end of a computer body, a plurality of ports for being connected with peripheral equipment-side ports on the other side end, and a printed circuit board for electrically connecting the ports to each other, and thus connecting the peripheral equipment-side ports with the computer-side ports integrally and electrically;

an outer case for protecting the connecting body from dust and impact; and coupling means for fixing the connecting body to the outer case.

DETAILED DESCRIPTION OF THE PREFERRED EMBODIMENTS

Preferred embodiments of the present invention are now fully described with reference to the accompanying drawings.

Figure 1:
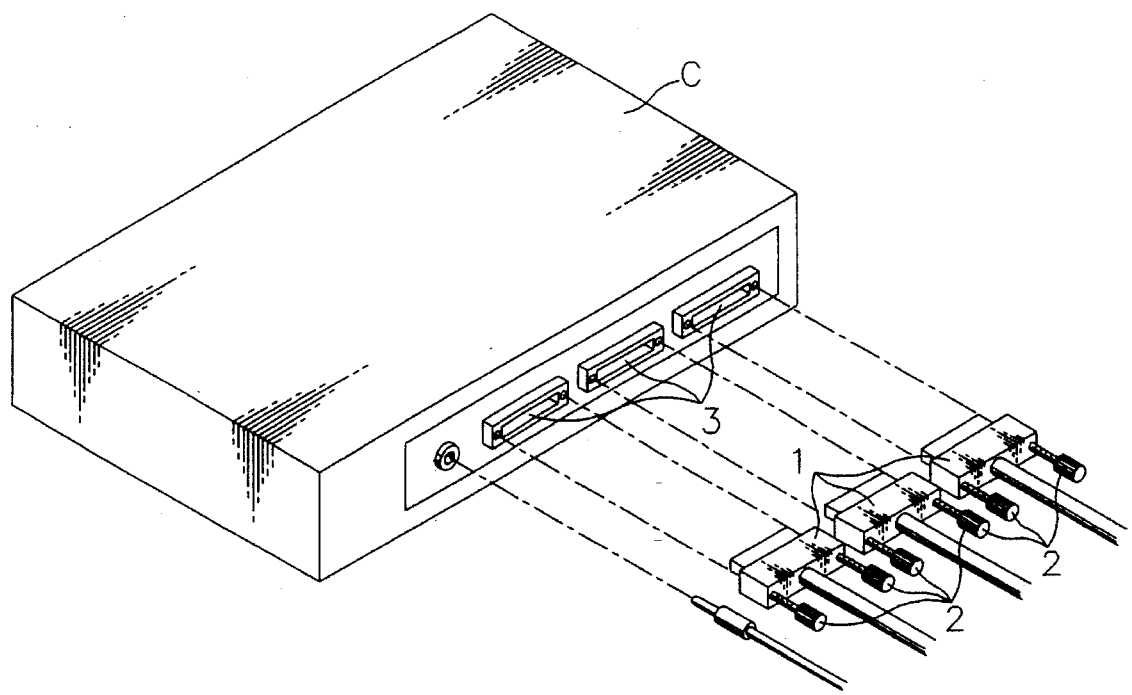
FIG. 1 is a perspective view showing the connection of peripheral equipment to a computer in accordance with a conventional technique.
Figure 2:
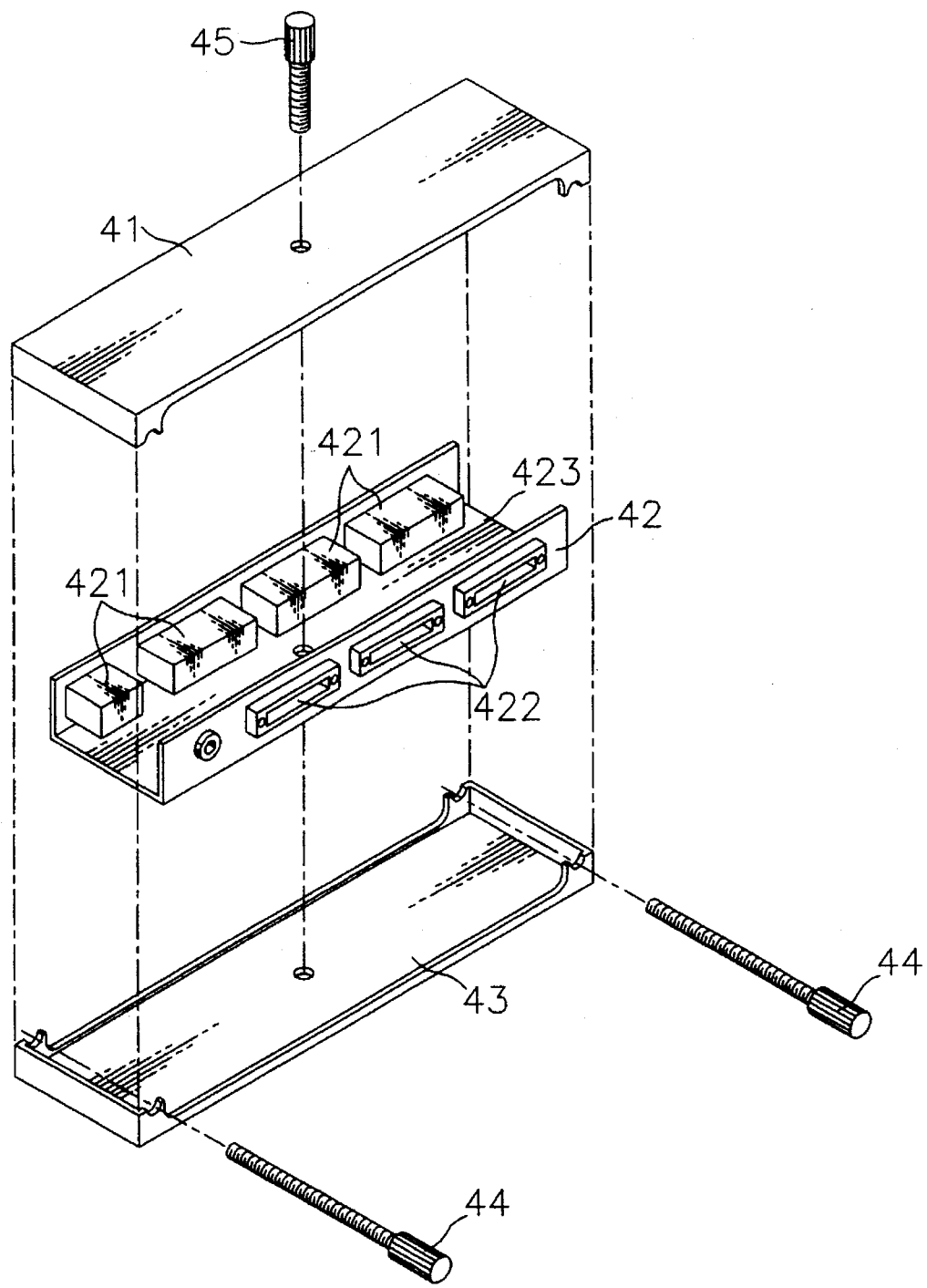
FIG. 2 is an exploded and perspective view of a cable manager system of a computer in accordance with a first preferred embodiment.

FIG. 2 is an exploded perspective view of a cable manager system of a computer in accordance with a first preferred embodiment.

As shown in FIG. 2, the cable manager system of a computer includes a connecting body 42 for electrically connecting, via wiring of an internal printed circuit board, ports for being connected to computer-side ports 3 formed on one side end to ports for being connected to peripheral equipment-side ports 1 on the other side end; a hexahedral upper case 41 having one opened facet and mounted over the connecting body 42; a hexahedral lower case 43 having one opened facet and mounted under the connecting body 42 to be coupled with the upper case 41; a coupling screw 45 inserted from the upper part through a screw hole of each central portion to couple the upper case 41, connecting body 42 and lower case 43 with each other; mounting screws 44 inserted into screw holes formed on the side portion of the system when the upper case 41 is coupled with the lower case 43.

The operation of the cable manager system of the first preferred embodiment is as follows.

The upper case 41 and lower case 43 are coupled with each other by the coupling screw 45, and the connecting body are 42 is inserted between the upper case 41 and the lower case 43, as shown in FIG. 2.

The ports 421 for being connected with the computer-side port 3 are attached to one side end of the connecting body 42 and the ports 422 for being connected with the peripheral equipment-side port 1 are attached to the other side end of the connecting body 42. A printed circuit board 423 for electrically connecting the ports 421, 422 to each other is formed on the connecting body 42.

The ports 421, 422 are a parallel port for a monitor or a printer, a series port for a MODEM, and jacks for an adaptor, for example.

After the connecting body 42 is coupled between the upper case 41 and the lower case 43, screw holes are formed on the left and right side portions of the cable manager system. The mounting screws 44 are inserted through the screw holes.

Figure 3:
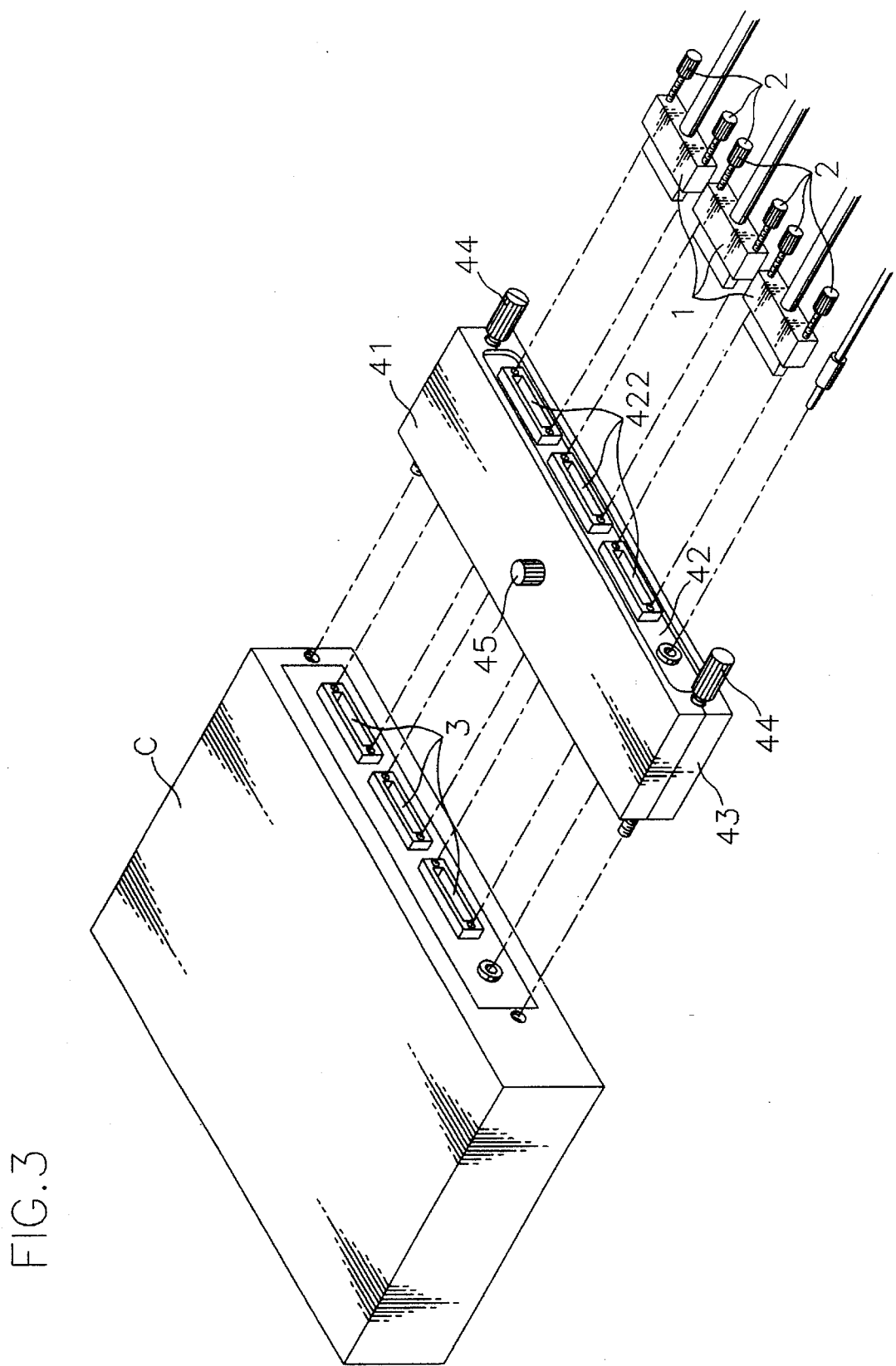
FIG. 3 is a perspective view showing the mounting the cable manager system of a computer in accordance with the first preferred embodiment of this invention.

FIG. 3 is a perspective view for mounting a cable manager system of a computer in accordance with the first preferred embodiment.

The peripheral equipment-side ports 1 are mounted on the ports 422 attached to the one-side end of the connecting body 42 of the cable manager system in order to couple the peripheral equipment with the computer by means of the cable manager system.

The mounting screws 2 are screwed up to fix the peripheral equipment-side ports 1 to the cable manager system.

When all the peripheral equipment-side ports 3 are fixed to the cable manager system, the cable manager system is approached to the body C of the computer. The ports 421 attached to the side end of the connecting body 42 of the cable manager system are mounted on the computer-side ports 3.

The mounting screws 44 are screwed up to cause the system to be fixed to the body C of the computer, and allow various peripheral equipment to interface with the central processing unit of the computer via the peripheral equipment-side ports 1, connecting body 42 of the cable manager system and computer side ports 3.

When a user wants to move the computer, the mounting screws 44 are unscrewed to separate the body C of the computer and the cable manager system, the peripheral equipment-side ports 1 being mounted on the connecting body 42 of the cable manager system.

Figure 4:
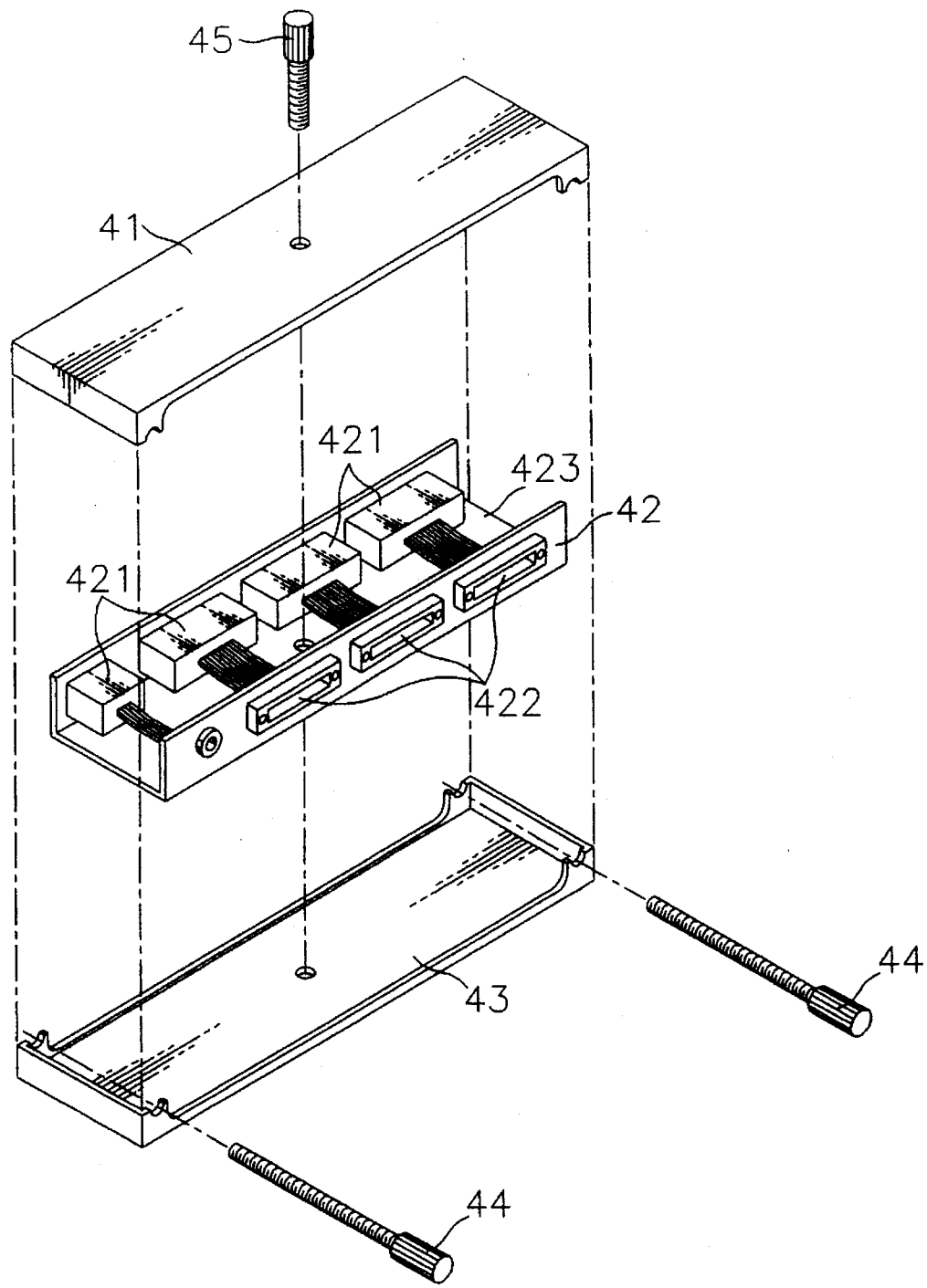
FIG. 4 is an exploded and perspective view of a cable manager system of a computer in accordance with a second preferred embodiment of this invention.

FIG. 4 is an exploded perspective view of the cable manager system of a computer in accordance with a second preferred embodiment of this invention.

The cable manager system of the second preferred embodiment includes ports 422 for being connected with peripheral-side ports 1 on one side end of a connecting body 42 and ports 421 for being connected with computer-side ports 3 on the other side end of the connecting body 42. The ports 421, 422 are electrically connected with corresponding ports by internal cables 424.

As a feature of this embodiment, the ports 421 and 422 attached to both side ends of the connecting body 42 are electrically connected by means of the cables 424, instead of the printed circuit board 423.

Figure 5:
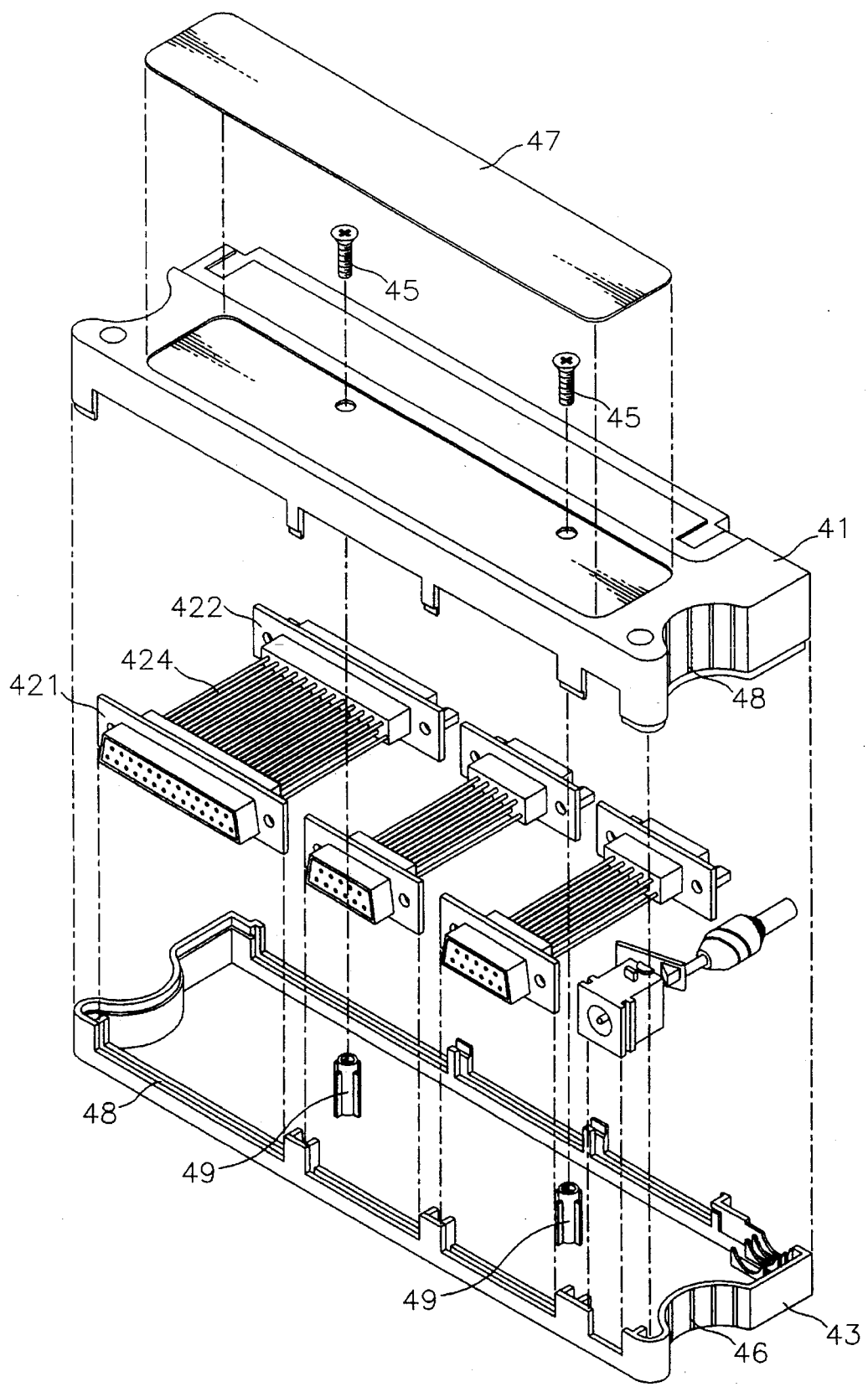
FIG. 5 is an exploded and perspective view of a cable manager system of a computer in accordance with a third preferred embodiment of this invention.

FIG. 5 is an exploded and perspective view of a cable manager system of a computer in accordance with a third preferred embodiment of this invention.

Referring to FIG. 5, the third preferred embodiment is now described. A handle shape 46 is formed on both sides of an upper case 41 and a lower case 43, and this handle shape is made so that the user may easily take the cable manager system.

Grooves 48 are formed on the borders of the upper case 41 and the lower case 43, and the grooves 48 are made to fix the ports 421, 422 attached to both side ends firmly on the upper case 41 and the lower case 43.

Mounting screws 45 are coupled with bosses 49 formed on the bottom of the lower case 43 via the screw holes of the upper case 41, and a cover 47 is inserted and assembled to the upper case 41 so that the mounting screws 45 are not noticeable from the outside.

Figure 6:
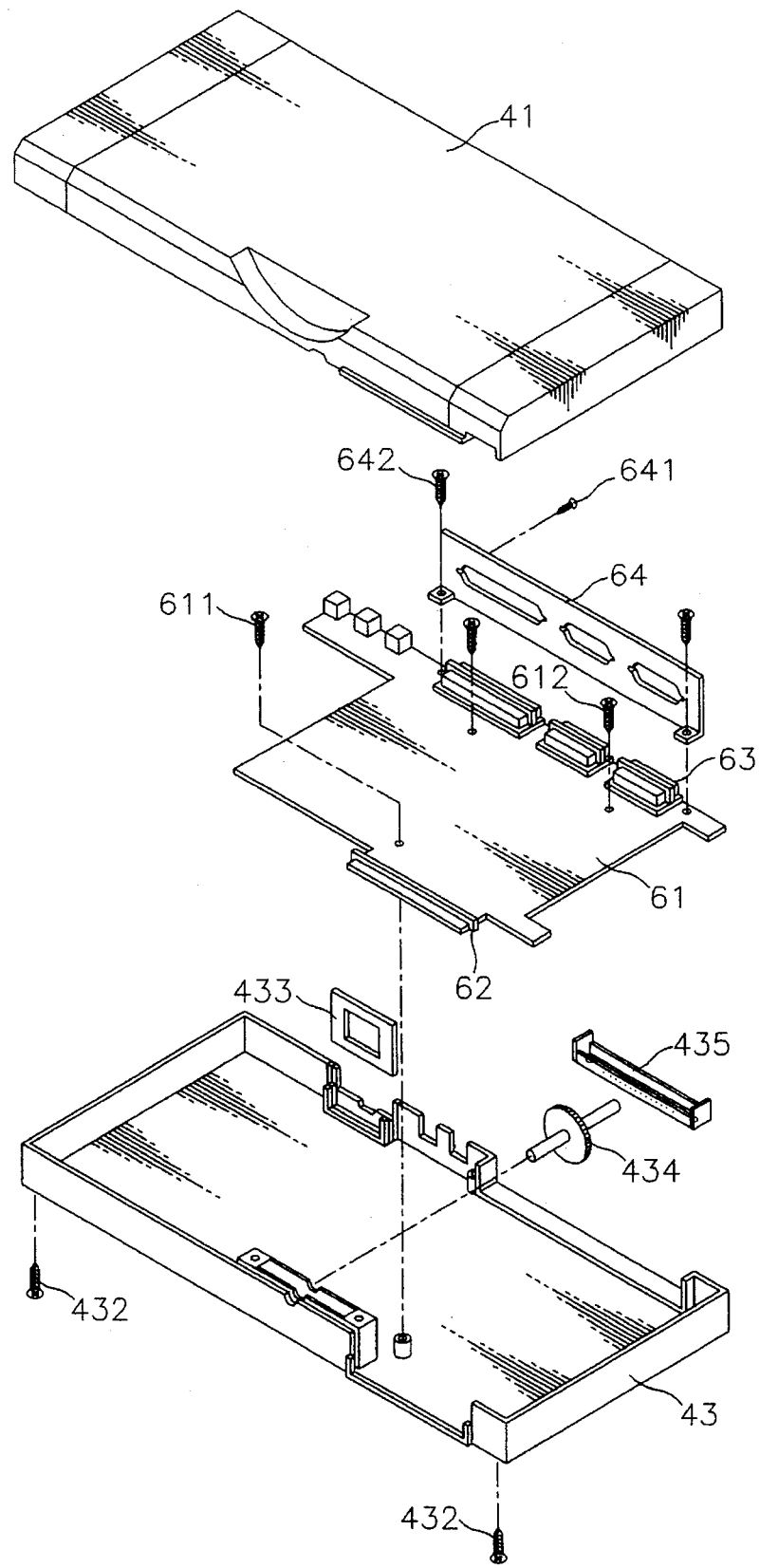
FIG. 6 is an exploded and perspective view of a cable manager system of a computer in accordance with a fourth preferred embodiment of this invention.

FIG. 6 is an exploded and perspective view of a cable manager system of a computer in accordance with a fourth preferred embodiment.

Referring to FIG. 6, the fourth preferred embodiment of this invention is now described.

A unit port 62 is attached to a printed circuit board 61 to be connected with the computer-side port 3. The unit port 62 is formed by uniting a plurality of ports to a single port through definition of a signal line. One unit port is designed so that pins are arranged by the same definition of the signal lines of a sort on the computer body C.

The cable manager system is mounted or removed on or from the computer body C of the computer just by coupling one port, and assembly of the cable manager system is improved. On the printed circuit board 61 there is a line for connecting electrically a plurality of ports 63 to which peripheral equipment-side ports 1 are connected to the unit port 62.

A plurality of ports 63 and a unit port 62 are attached on the printed circuit board 61, and a cover 64 for supporting the ports 63 and blocking up the empty space is installed on the printed circuit board 61 by an assembly screw 641. The printed circuit board 61 is mounted on the lower case 43 by assembling screws 611, 612 and 642.

Door 433 is inserted and assembled to the side portion of the lower case 43, and by the assembling screws 432 the upper case 41 is coupled to the lower case 43 on which the printed circuit board 61 is installed.

In the fourth preferred embodiment, the unit port 62 is formed to be connected with the ports of the computer body C.

The plurality of ports 63 for being connected with the peripheral equipment-side ports 1 and the unit port 62 for being connected with the computer body C are designed to be electrically connected with each other by the printed circuit board 61.

Figure 7:
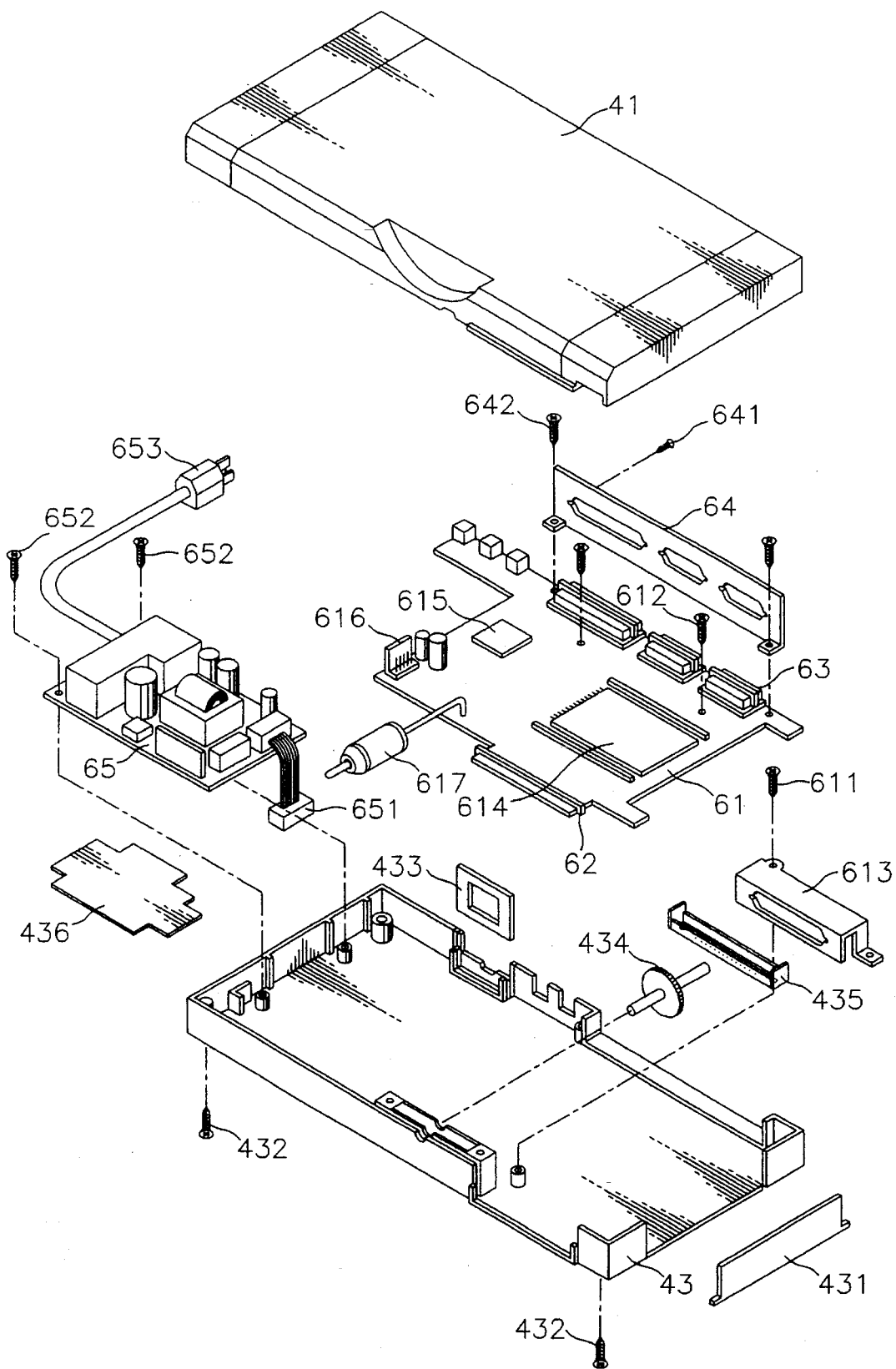
FIG. 7 is an exploded and perspective view of a cable manager system of a computer in accordance with a fifth preferred embodiment of this invention.
Figure 8:
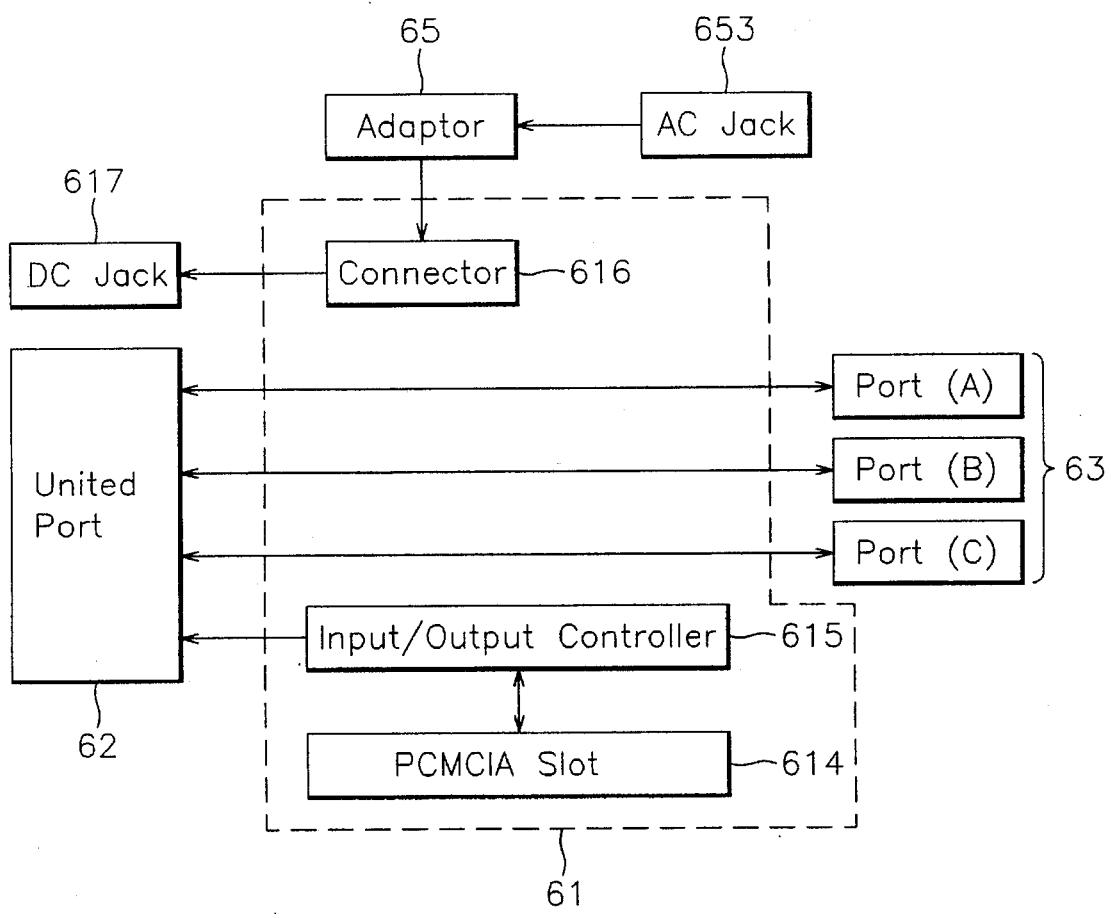
FIG. 8 is a block diagram of the formation of a printed circuit board of FIG. 7.

FIG. 7 is an exploded and perspective view of a cable manager system of a computer in accordance with a fifth preferred embodiment of this invention. FIG. 8 is a block diagram of a printed circuit board of FIG. 7.

Referring now to FIGS. 7 and 8, the fifth preferred embodiment of this invention is described as follows.

The function of the cable manager system is more expanded, and there are a power adaptor 65, a personal computer memory card international association (PCMCIA)

slot 614 and an input/output controller 615, in addition to the formation of the fourth preferred embodiment.

A pin for a PCMCIA card is additionally arranged on the unit port 62, and the PCMCIA card is mounted on the PCMCIA slot 614.

The PCMCIA slot 614 is connected to the input/output controller 615, and the input/output controller 615 is connected to a unit port 62. The input/output controller 615 and the unit port 62 are electrically connected to each other via the electronic line of the printed circuit board 61.

The adaptor 65 is connected to an alternating current (AC) jack 653 to which alternating current is applied, and the alternating current power is converted to a direct current power by the adaptor 65. The direct current power is transmitted to the computer body C through an adaptor-side connector 651 and a connector 616 mounted on the printed circuit board 61 and via a direct current (DC) jack 617. The connector 616 and the DC jack 617 are connected to each other via the internal electronic line of the printed circuit board 61.

An insulating material 436 is applied on the lower case 43 before assembling the adaptor 65. The adaptor 65 is mounted on the lower case 43 by assembling screws 652. The adaptor-side connector 651 is connected to the connector 616 mounted on the printed circuit board 61.

A port-type cover 64 is mounted by the assembling screw 641 on the printed circuit board 61 on which the unit port 62, port 63, PCMCIA slot 614 and input/output controller 615. The assembling screw 642 mounts the cover 64 and the printed circuit board 61 on the lower case 43.

The assembling screw 612 is to mount the PCMCIA slot 614 on the printed circuit board 61.

A bracket 613 is mounted by an assembling screw 611 on the computer side of the lower computer 43, and the computer-side unit port is inserted into the slot of the bracket. A coupling screw 434 and a bracket 435 are assembled on the lower case-side computer. The coupling screw 434 combines the cable manager system with the computer body C, and the coupling screw 434 shown through the grooves of the upper case 41 in an assembling condition is screwed or unscrewed in order that the cable manager system is mounted or removed on or from the computer body C. And the bracket 435 is a guide means to prevent the removal of the coupling screw 434.

Doors 431, 433 are mounted to prevent dust from being introduced to the cable manager system on the rear and side portions of the lower case 43. After the adaptor 65 and the printed circuit board 61 are assembled to the lower case 43, the upper case 41 is mounted on the lower case 43 by the assembling screws 432.

As described above, the preferred embodiments of the present invention provide the cable manager system unifying ports of various peripheral devices to one between the computer-side ports 3 and the peripheral equipment-side ports 1 to enhance the convenience of a user at the time of connecting the peripheral equipment to the computer.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A cable manager system of a computer comprising:

a connecting body including a plurality of first ports, for being connected with computer-side ports, on one side of the connecting body, a plurality of second ports, for being connected with peripheral equipment-side ports, on the other side of the connecting body, and means for electrically connecting said first ports to respective one of said second ports, and thus connecting said peripheral equipment-side ports with said computer-side ports integrally and electrically when said computer side ports are connected with said first ports and said peripheral equipment-side ports are connected to said second ports;

an outer case disposed around said connecting body for protecting said connecting body from dust and impact;

coupling means for fixing said connecting body to the outer case;

a cover disposed on the outer case to cover a mounting screw of said coupling means.

2. The system according to claim 1, wherein the connecting body is coupled with the computer body by mounting screws.

3. The system according to claim 1, wherein said first ports are electrically connected to corresponding ones of said second ports by cables.

4. The system according to claim 1, wherein said first and second ports are each one of a serial port for a mouse and a modem and a parallel port for a mouse and a modem.

5. The system according to claim 1, wherein a handle shape is formed on said outer case so that a user may easily grasp the case.

6. The system according to claim 1, wherein said outer case comprises two case portions and grooves are formed on borders of the two case portions and the ports are received in the grooves to be fixed firmly to said outer casing.

7. A cable manager system of a computer comprising:

a single unit port for being connected with a computer body;

a plurality of peripheral ports for being connected with peripheral equipment-side ports;

means for electrically connecting said unit port to the plurality of ports by an internal electronic line;

an adaptor including an alternating current jack and a direct current jack for converting the alternating current power to a direct current power to supply power to the computer;

an outer case; and coupling means for fixing said electrically connecting means to said outer case, wherein means for insulating is inserted between the adaptor and the outer case.

8. The system according to claim 7, wherein a handle shape is formed on said outer case so that a user may easily grasp the case.

9. A cable manager system of a computer comprising:

a single unit port for being connected with a computer body;

a plurality of peripheral ports for being connected with peripheral equipment-side ports;

means for electrically connecting said unit port to the plurality of peripheral ports by an internal electronic line;

an adaptor including an alternating current jack and a direct current jack for converting alternating current power to a direct current power to supply power to the computer;

a slot attached to said electrically connecting means to install a personal computer memory card international association (PCMCIA);

an input/output controller for transmitting a signal line of said slot to the unit port;

an outer case; and coupling means for fixing said electrically connecting means to said outer case.

10. The system according to claim 9, wherein a port cover is installed on said electrically connecting means to support the plurality of peripheral ports.

11. The system according to claim 9, wherein a door is assembled on a side surface of the outer case to prevent dust from being introduced from outside.

12. The system according to claim 9, wherein means for insulating is inserted between the adaptor and the outer case.

13. The system according to claim 9, wherein a coupling screw and a bracket are mounted on the front portion of the outer case and said coupling screw extends through the outer case to allow the outer case to be mounted on or removed from the computer body by screwing or unscrewing the coupling screw.

14. The system according to claim 9, wherein said means for electrically connecting is cables or a printed circuit board.

15. The system according to claim 9, wherein said peripheral ports are each one of a serial port and a parallel port.

16. The system according to claim 9, wherein a handle shape is formed on said outer case so that a user may easily grasp the case.

17. The system according to claim 9, wherein said outer case comprises two case portions and grooves are formed on borders of the two case portions and the ports are received in the grooves to be fixed firmly to said outer casing.

* * * * *